United States Patent [19]

Muzny

[11] Patent Number: 5,769,443
[45] Date of Patent: Jun. 23, 1998

[54] ALIGNMENT GUIDE ASSEMBLY FOR TRAILER HITCHES

[75] Inventor: John Muzny, Catawba, S.C.

[73] Assignee: Billy Ray Marcom, Bedford, Tex.

[21] Appl. No.: 584,102

[22] Filed: Jan. 11, 1996

[51] Int. Cl.[6] ........................................................ B60D 1/06
[52] U.S. Cl. ............................................. 280/477; 280/511
[58] Field of Search .................................... 280/477, 475, 280/478.1, 479.1, 479.2, 479.3, 508, 511; 172/272

[56] References Cited

U.S. PATENT DOCUMENTS

| | | | |
|---|---|---|---|
| 3,891,237 | 6/1975 | Allen | 280/477 |
| 4,657,276 | 4/1987 | Hamerl | 280/477 |
| 4,792,151 | 12/1988 | Feld | 280/477 |
| 4,903,978 | 2/1990 | Schrum, III | 280/477 |
| 5,114,170 | 5/1992 | Lanni et al. | 280/477 |
| 5,161,815 | 11/1992 | Penor, Jr. | 280/511 |
| 5,290,056 | 3/1994 | Fath, IV | 280/477 |
| 5,308,100 | 5/1994 | Heider et al. | 280/478.1 |
| 5,435,587 | 7/1995 | Beddows | 280/477 |

*Primary Examiner*—Brian L. Johnson
*Assistant Examiner*—Gary Savitt
*Attorney, Agent, or Firm*—Clifton Ted Hunt, PA

[57] ABSTRACT

The alignment guide assembly includes an alignment guide that is movable between an operative and an inoperative position on the tongue of a trailer without removing any of its parts. The alignment guide assembly also includes a stop bracket on the trailer hitch of a tow vehicle, and in its operative position, the alignment guide is capable of longitudinally aligning a hitch ball on the tow vehicle with a socket on the tongue of the trailer, of locating the hitch ball in vertical alignment with the socket, and of stopping downward movement of the trailer tongue when the socket is in position to be locked to the hitch ball.

14 Claims, 6 Drawing Sheets fig. 1.

ALIGNMENT GUIDE ASSEMBLY FOR TRAILER HITCHES

FIELD OF THE INVENTION

This invention relates to trailer hitches and more specifically to a guiding device that aligns the socket on a trailer with the hitch ball on a tow vehicle as the vehicle is backed toward the trailer to connect the two together.

BACKGROUND OF THE INVENTION

The difficulties encountered while aligning the hitch ball on a vehicle with the socket on a trailer are well known, and many attempts to remove or minimize the difficulties are disclosed in the prior art patents. The following patents have been selected as exemplary of the known prior art and as the most pertinent to the present invention:

| PATENT NO. | ISSUE DATE: | INVENTOR: | TITLE: |
| --- | --- | --- | --- |
| 4,254,968 | Mar 10, 1981 | DelVecchio | REMOVABLE BALL GUIDE ATTACHMENT FOR TRAILER HITCHES |
| 4,416,466 | Nov 22, 1983 | Park | TRAILER HITCH GUIDE |
| 4,560,183 | Dec 24, 1985 | Cook | TRAILER HITCH GUIDE |
| 4,773,667 | Sep 27, 1988 | Elkins | PROXIMITY HITCH |
| 4,802,686 | Feb 7, 1989 | Isreal | TRAILER HITCH |
| 5,114,170 | May 19, 1992 | Lanni et al | TRAILER COUPLING GUIDE |

Some of the guiding devices of the prior art are relatively complicated and cumbersome and some of them may require an undue amount of mechanical skills to install and operate. Others require time consuming assembly and disassembly of parts each time the guiding device is put in and taken out of use, with the consequent inconvenience of storing parts between uses. The present invention provides the average user of trailer hitches with an alignment guide that may be easily installed on the tongue of a trailer hitch and operated with minimal effort to reliably guide the socket on the coupler at the front of the tongue into longitudinal alignment with the hitch ball on the towing vehicle, and to positively locate the hitch ball in vertical alignment with the elevated socket on the trailer hitch. Another advantage of the present invention is that the alignment guide may be stored on top of the tongue without removing it from the trailer or taking it apart after it has been used.

SUMMARY OF THE INVENTION

As is well known to those skilled in the art, a conventional trailer hitch includes a tongue extending forwardly from the trailer with a socket at the forward end of the tongue. The alignment guide assembly of the present invention is made of steel and includes a bracket that is fastened to the tongue by bolts or welding. The alignment guide includes side walls with forwardly converging body portions and forwardly diverging guide plates that extend beyond the socket when the alignment guide is assembled for use on the tongue of a trailer. The guide plates guide the socket into longitudinal alignment with the hitch ball as the tow vehicle moves toward the trailer.

A hold-down bar is rotatable into and out of an operative position beneath the body portions of the alignment guide and beneath the trailer tongue. The hold-down bar includes a curved seat that, in its operative position, is beneath and in direct vertical alignment with the socket on the elevated tongue of the trailer hitch. The curved seat functions to receive the hitch ball and position the hitch ball in direct vertical alignment with the socket on the elevated tongue so the socket will receive and be joined with the hitch ball when the tongue is lowered, as by manipulating a jack in a conventional manner.

The hold-down bar is pivotally connected to one side of the alignment guide and is latched to the other side of the alignment guide in its operative position while the socket is being aligned with the hitch ball. After the alignment is made, the hold-down bar is rotated downwardly and out of its operative position beneath the tongue as the tongue is lowered and the socket is locked to the hitch ball in a conventional manner. Thereafter, the assembly guide is rotated rearwardly about its pivotal connection to the bracket and the hold-down bar is latched to the alignment guide. The alignment guide is then locked in its inoperative position on top of the tongue for storage until the alignment guide is needed again. Unlike some of the prior art alignment devices there is no need to remove the alignment guide from the tongue after the trailer is connected to the tow vehicle.

DETAILED DESCRIPTION OF THE INVENTION

Figures 1, 2:
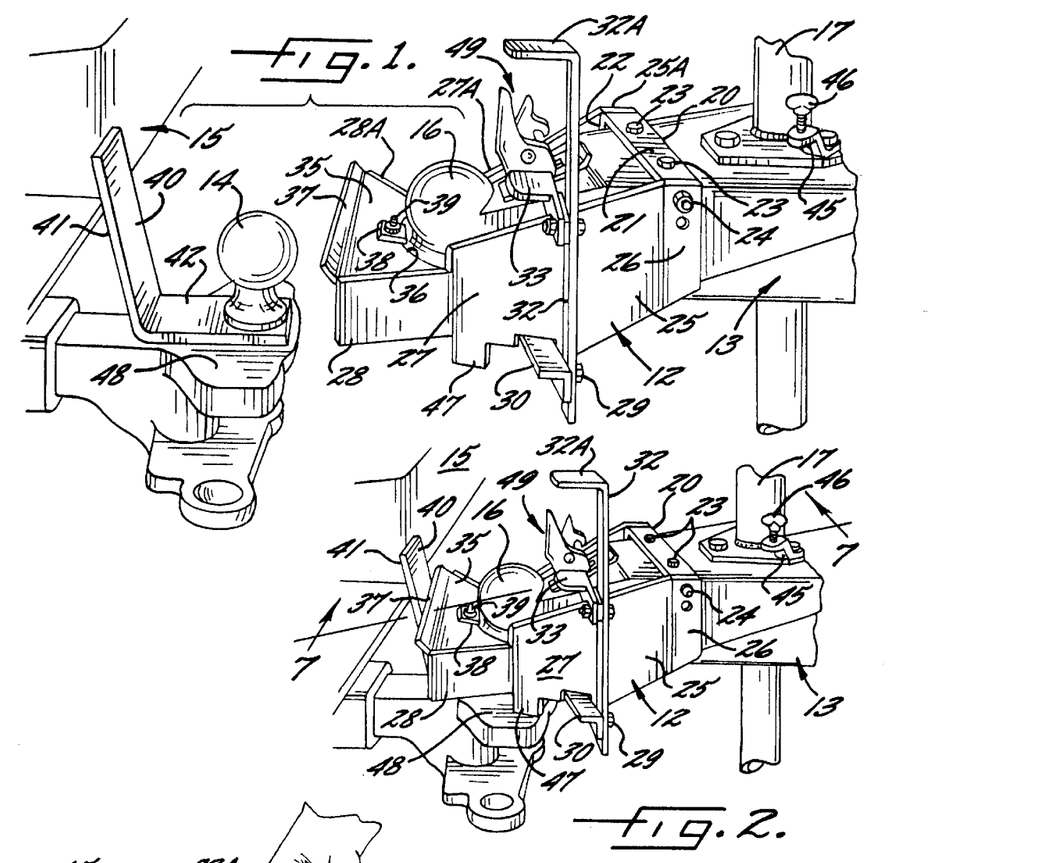
FIGS. 1 and 2 are sequential perspective views showing the alignment guide and hold-down bar in operative position to align a socket on the tongue of a trailer with a hitch ball on a tow vehicle.

Referring more specifically to the drawings, an alignment guide is broadly indicated at 12. In FIGS. 1 and 2 the alignment guide 12 is shown in its operative position on an elevated tongue 13 of a trailer, not shown. The alignment guide occupies its operative position while the hitch ball 14 on a tow vehicle 15 is moved toward the tongue 13 for operative engagement with a socket 16 on the tongue.

The trailer hitch 13 extends forwardly in a conventional manner from a trailer (not shown) and is supported in an elevated position, as shown in FIGS. 1, 2, 7, and 8, by a jack 17. As is well known, it is customary to elevate the trailer hitch and its socket above the horizontal plane occupied by the hitch ball 14 while the hitch ball is maneuvered into position beneath the socket.

The alignment guide 12 comprises a U-shaped bracket 20 that includes a transversely extending body portion 21 and a pair of relatively short legs 22 (FIG. 4) extending perpendicularly from the ends of the body portion. The body portion 21 of bracket 20 extends across the top of the tongue 13 between the socket 16 and the jack 17. The bracket 20 is shown as being fastened to the tongue by bolts 23 but the bracket need not be removed and can be welded to the tongue 13 within the spirit of the invention. The legs 22 of the bracket 20 extend partially down the sides of the tongue 13 and have through-holes (not shown) to receive bolts 24.

Side walls 25 and 25A of the alignment guide 12 include flanges 26, 26A that are pivotally connected to the bracket 20 by the bolts 24. The side walls 25 and 25A are transversely spaced from each other and extend along the sides of the tongue 13 from the bracket 20 to a point beyond the socket 16. Body portions 27, 27A of the side walls 25, 25A extend forwardly in converging relation to each other from their respective flanges 26, 26A, and guide plates 28, 28A extend forwardly in diverging relation to each other from the body portions 27, 27A.

A hold-down bar 30 extends transversely beneath the side walls 25, 25A in use, as seen in FIGS. 1–3, 7 and 10. There is a pivotal connection (broadly indicated at 31 in FIG. 10) between one end of the hold-down bar 30 and the body portion 27A. A handle 32 is pivotally connected to the other end of the hold-down bar 30 as at 29 and, in use, the handle 32 is latched to the body portion 27 as at 33 (FIGS. 1–3 and 11).

The hold-down bar 30 and a bracket 30A pivotally support a curved seat 34 in position to receive the hitch ball 14 directly beneath the socket 16 so the socket will engage the ball when the tongue 13 is lowered.

A stop plate 35 with an inwardly curved rear edge 36 and an upwardly curved leading edge 37 is welded to the upper edges of the guide plates 28, 28A. In use, the inwardly curved rear edge 36 fits around the socket 16 as shown in FIGS. 1–3 and 10. A short strip of metal 38 is fastened to the upper surface of the stop plate 35 in overlying relation to the inwardly curved rear edge 36 by a bolt and nut 39. The metal strip 38 fits over the edge of the socket 16 when the alignment guide is installed on the tongue 13 in the operative position of FIGS. 1 and 7.

Figure 7:
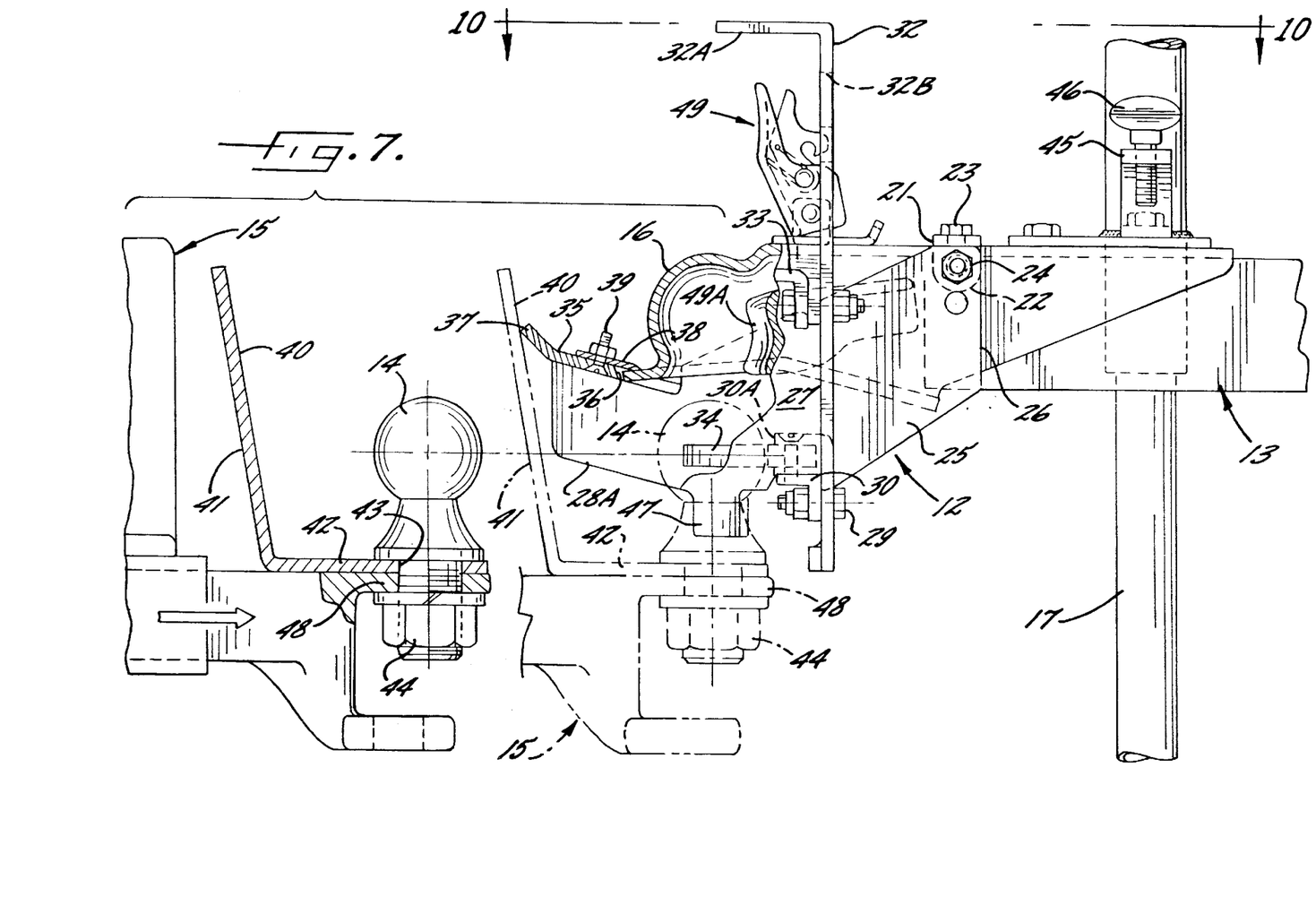
FIG. 7 is a sectional view taken substantially along the line 7—7 in FIG. 2.

The upwardly curved leading edge 37 of the stop plate 35 is provided to engage an upstanding and forwardly inclined leg 40 of an L-shaped stop bracket 41. As best seen in FIGS. 1 and 7, a horizontally disposed leg 42 of the stop bracket 41 extends rearwardly from the upstanding leg 40. The leg 42 has a through-hole 43 that receives the bolt 44 conventionally used to attach the hitch ball 14 to the tow vehicle 15.

Installation of the Alignment Guide Assembly

The recommended first step in installing the alignment guide assembly is to remove the hitch ball 14 from the tow vehicle 15 and replace it after passing the hitch ball bolt 44 through the through-hole 43 in the stop bracket 41 and positioning the upstanding leg 40 forwardly of the hitch ball 14, as shown in FIGS. 1 and 7.

Next, the alignment guide 12 is positioned in its operative position on the tongue 13, as shown in FIG. 1, and the bracket 20 is welded to the tongue 13 or fastened to the tongue by the bolts 23 with the forward edge of the socket 16 beneath the metal strip 38, as shown in FIGS. 1 and 7. It will, of course, be necessary to drill holes in the tongue to accommodate the bolts 23 if it is decided to use the bolts.

Figure 9:
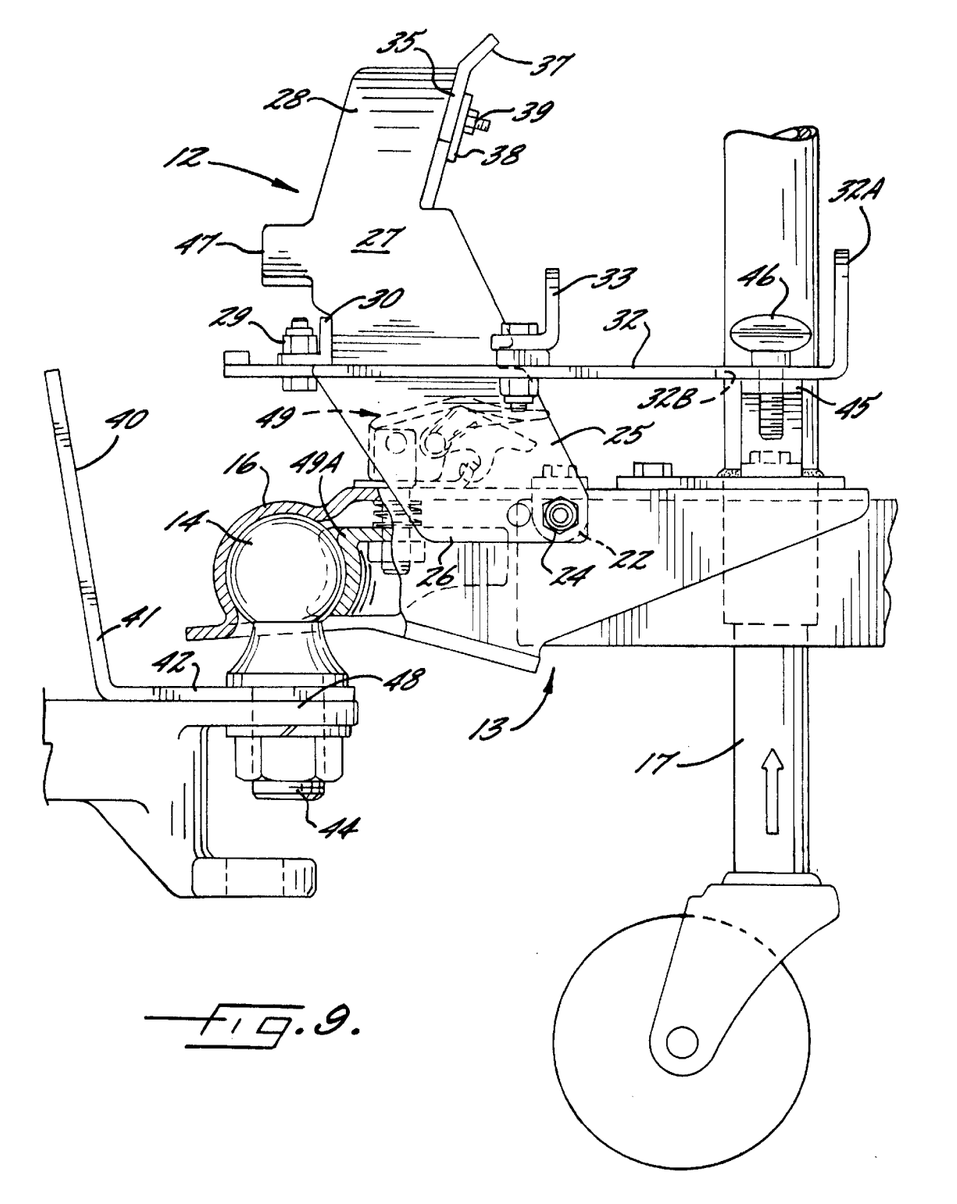
FIG. 9 is a side view, partially in section, showing the alignment guide in its inoperative position with the hold-down bar latched in place.

The final step in installing the alignment guide assembly is to remove one of the ⅜×¾" bolts that are conventionally used to attach the jack 17 to the tongue, and replace it with a ⅜×1" bolt to fasten a safety bracket 45 and its thumb screw 46 to the tongue adjacent the jack 17 as shown in FIGS. 1 and 9.

Operation of The Alignment Guide Assembly

With the alignment guide 12 installed on the tongue 13 and the stop bracket 41 installed on the tow vehicle, the first step in connecting the trailer to the tow vehicle is to measure the height of the hitch ball 14 and raise or lower the trailer tongue 13 as needed for the hitch ball to move beneath the socket 16.

The tow vehicle is then backed toward the trailer until the forwardly inclined leg 40 of the stop bracket 41 on the tow vehicle comes into contact with the upwardly curved leading edge 37 of the stop plate 35 on the trailer. That is all that is necessary to align the hitch ball with the socket.

Figure 10:
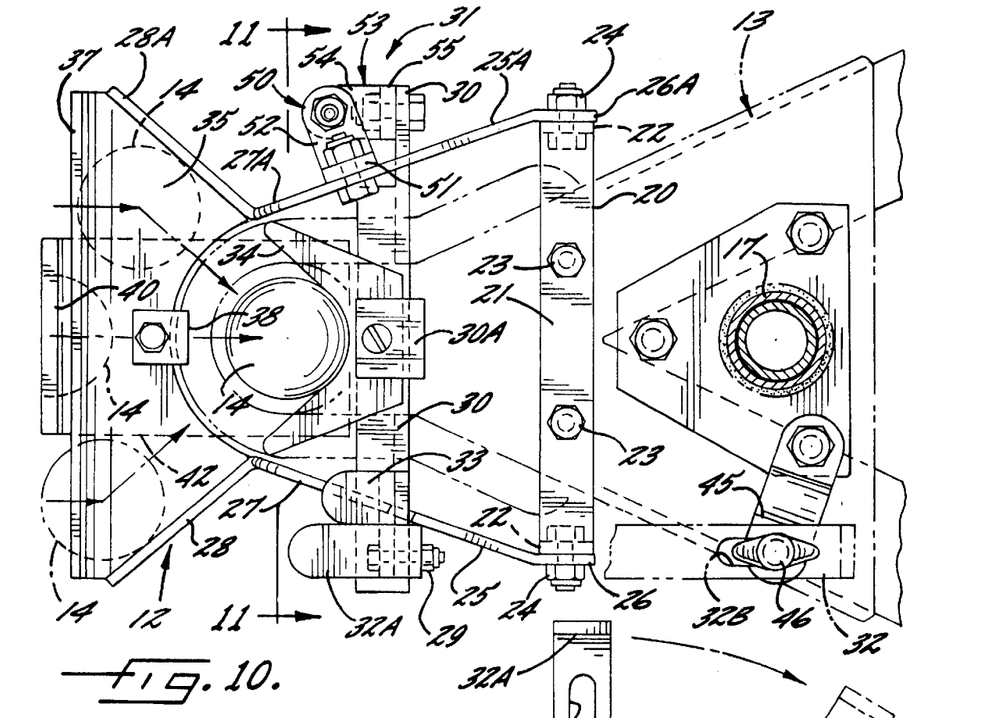
FIG. 10 is a top plan view of the alignment guide operatively positioned on the tongue, showing the hitch ball in its solid line position in the curved seat and in phantom lines in three positions illustrating the guidance of the hitch ball to the curved seat; and showing the handle in phantom lines locked in its inoperative position.

As seen in FIG. 10, the guide plates 28 and 28A will longitudinally align the ball and socket by directing the hitch ball into the curved seat 34 when the tow vehicle is appropriately maneuvered so that the upstanding leg 40 of the stop bracket 41 on the tow vehicle engages some point on the leading edge 37 of the stop plate 35.

Figure 8:
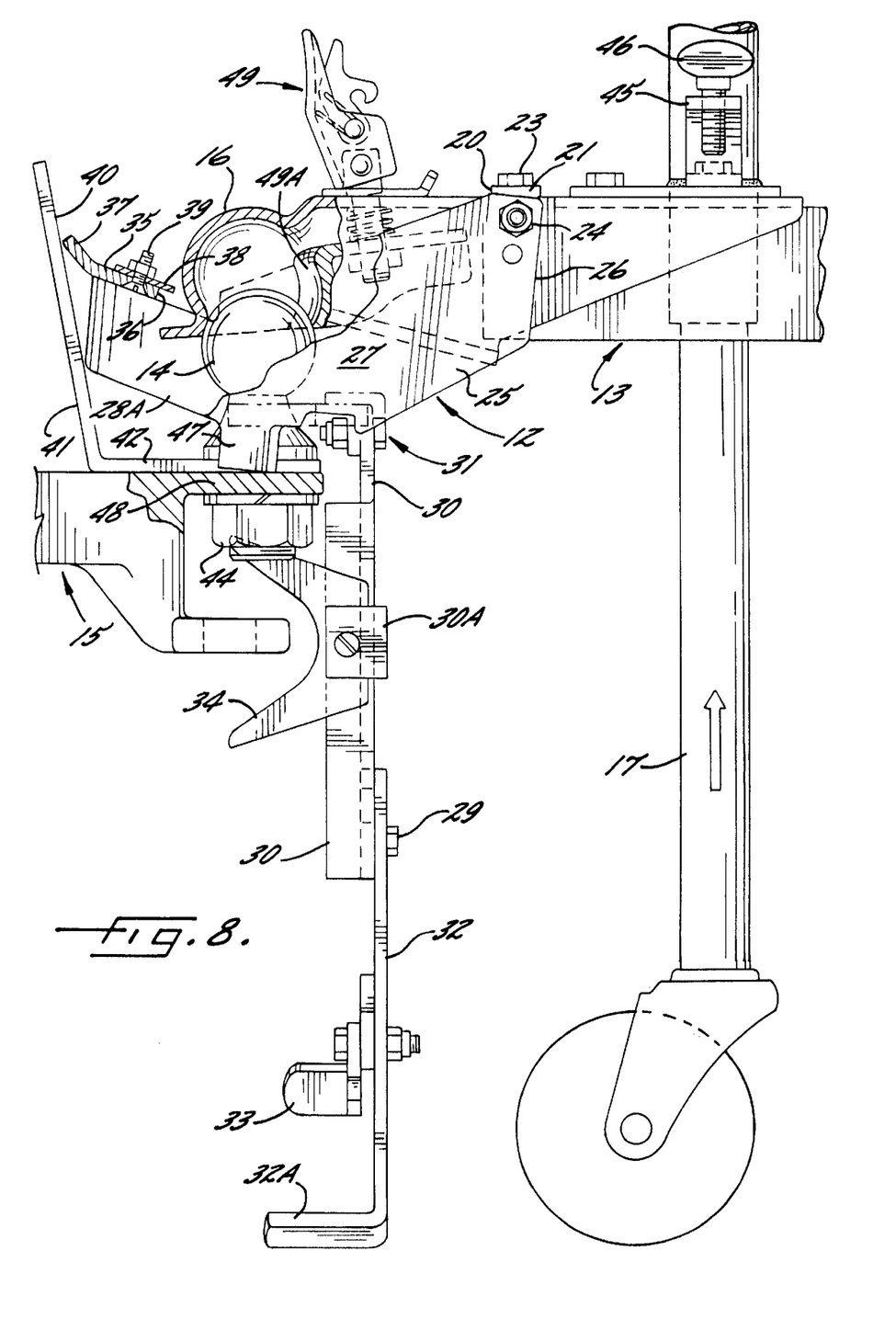
FIG. 8 is a side view, partially in section, illustrating the removal of the hold-down bar from its operative position beneath the tongue just prior to the socket being lowered and locked to the hitch ball.

As seen in FIG. 7, the alignment guide 12 is structured and dimensioned to locate the curved seat 34 directly beneath and in vertical alignment with the socket 16 when the hitch ball 14 is seated in the curved seat 34. The hitch ball is thus positioned to be engaged by the socket 16 when the tongue is lowered, as shown in FIG. 8. The vertical alignment of the hitch ball and socket is caused by the leading edge 37 of the stop plate being spaced forwardly from the curved seat 34 the same distance as the leg 40 of the stop bracket 41 is spaced forwardly from the hitch ball 14, as best seen in FIG. 7.

Figure 3:
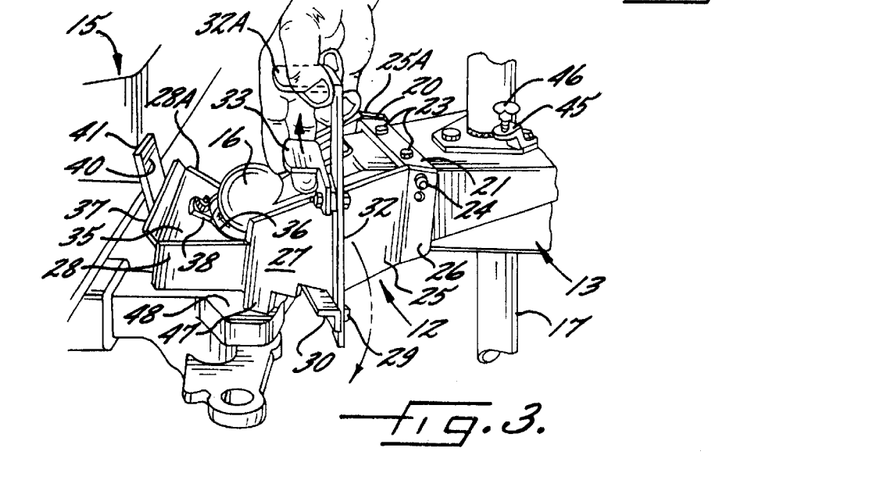
FIGS. 3, 4, 5 and 6 are sequential perspective views illustrating the removal of the hold-down bar from its operative position beneath the tongue of a trailer hitch and the rotation of the alignment guide to its inoperative position.

The next step in connecting the trailer to the tow vehicle is to lower the tongue 13 from the position of FIG. 7 until a downwardly extending flange or abutment 47 on the side wall 27 comes in contact with the top of the trailer hitch 48 supporting the hitch ball 14 on the tow vehicle. The flange 47 extends downwardly from the side wall at its juncture with the guide plate 28. That juncture of the side wall 27 and guide plate 28, and the flange 47, become transversely aligned with the socket 16 when the leading edge 37 contacts the leg 40 on stop bracket 41, as seen in FIGS. 2, 3 and 8.

When the flange 47 contacts the trailer hitch 48 on the tow vehicle, the socket 16 is at the proper elevation relative to the hitch ball 14 to be locked to the hitch ball 14 by manipulation in a conventional manner of the locking assembly 49 from the solid line to the phantom line position in FIG. 8. Meanwhile, the latch 33 is grasped, as shown in FIG. 3, and the hold-down bar 30 and handle 32 are rotated from the FIG. 7 position to the FIG. 8 position. This takes the curved seat 34 away from the hitch ball 14 so the hitch ball is accessible by the socket 16.

Figures 4, 5, 6:
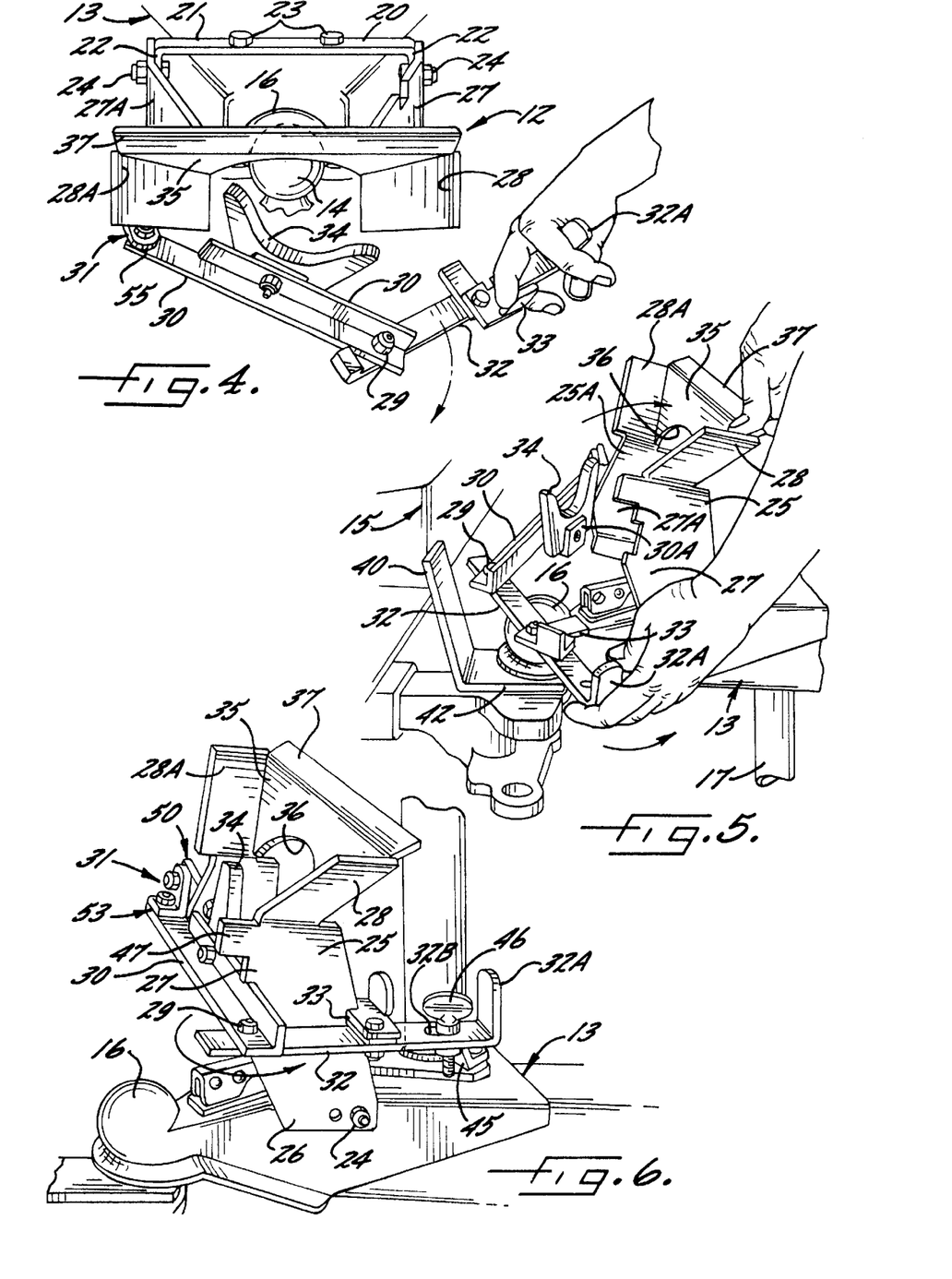
Figure 11:
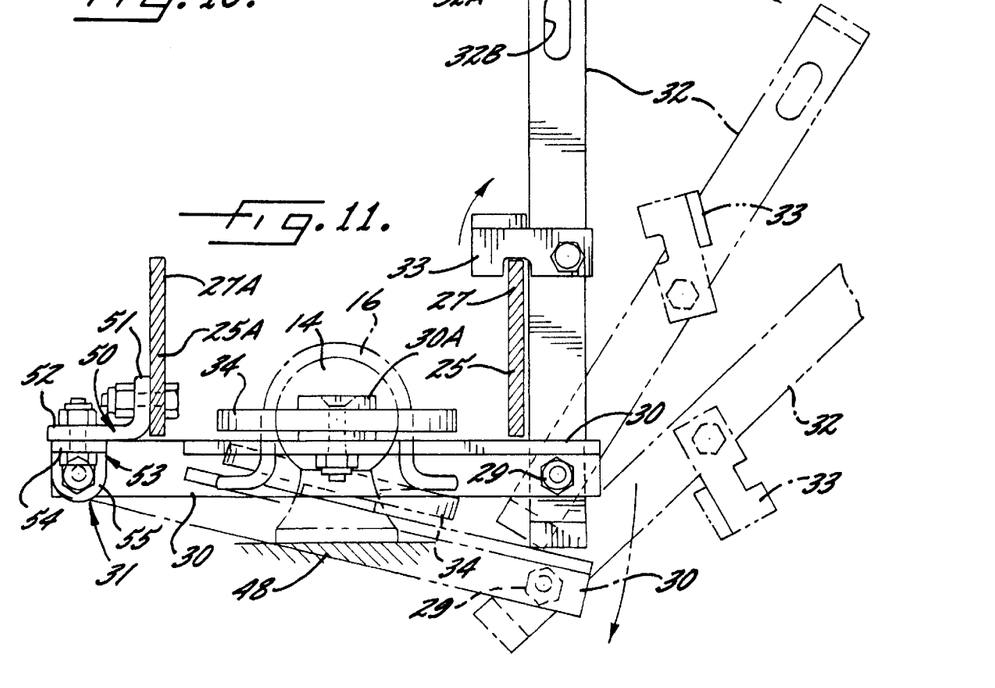
FIG. 11 is a sectional view taken substantially along the line 11—11 in FIG. 10.

The handle 32 includes a top portion 32A and has a slot 32B near the top 32A (FIG. 11). As seen in FIG. 3, the first step in rotating the hold-down bar 30 from the operative position of FIGS. 1 and 2 to the inoperative position of FIG. 6 is for the operator to grasp the latch 33 and the top 32A of the handle 32. Pulling up on the latch 32 releases the hold-down bar 30 from the body portion 27 and enables the operator to rotate the hold-down bar 30 about its pivotal connection 31 with body portion 27A to the position of FIG. 4, and to continue rotation of the hold-down bar to the position of FIG. 8 where the hold-down bar 30 is no longer under the tongue 13, as in the operative position of FIG. 1, but hangs straight down from the body portion 27A.

As best seen in FIGS. 10 and 11, the pivotal connection 31 comprises a first angle iron 50 with apertured legs 51 and 52 extending in perpendicular relation to each other and a second angle iron 53 with apertured legs 54 and 55 extending in perpendicular relation to each other. The leg 51 of angle iron 50 is pivotally attached by a bolt to body portion 27A and the leg 52 of angle iron 50 is pivotally attached by a bolt to leg 54 of angle iron 53. The leg 55 of angle iron 53 is pivotally attached by a bolt to the end of the hold-down bar 30 remote from the handle 32.

With the hold-down bar 30 in the downward position of FIG. 8, the next step in moving the alignment guide 12 to the inoperative position of FIGS. 6 and 9 is to rotate the alignment guide 12 rearwardly about its pivotal connection 24 to the bracket 20 while rotating the hold-down bar upwardly about the pivotal connection 54 between the angle irons 50 and 53. The hold-down bar 30 is then rotated rearwardly about the pivotal connection between the angle iron 53 and the hold-down bar until the hold-down bar is seated in a notch 56 in the body portion 27.

The handle 32 extends rearwardly from the hold-down bar 30 in the inoperative position of FIGS. 6 and 9 with the top 32A of the handle adjacent the jack 17. The alignment guide is held in its inoperative position by the wing-nut 46 penetrating the slot 32B in the handle 32 and by the latch 33 attaching the hold-down bar to the body portion 27. The hold-down bar 30 occupies the same position relative to the body portions 27 and 27A in both the operative position of FIG. 1 and the inoperative position of FIGS. 6 and 9.

The stop bracket may remain on the tow vehicle at all times and be available for use with the alignment guide when wanted. The alignment guide 12 may be quickly restored to its operative position when desired by simply releasing the wing-nut 46 and the latch 33 to release the hold-down bar and handle, and then rotating the alignment guide forwardly about its pivotal connection with the bracket 20. The final step in restoring the alignment guide to its operative position is to move the hold-down bar under the tongue and latch it to the body portion 27 at 33, as shown in FIG. 1.

There is thus provided a self-contained alignment guide capable of aligning the hitch ball and socket both longitudinally and vertically, and capable of being moved into operative and inoperative positions on the trailer without the need for connecting or disconnecting any parts, thereby minimizing the problem of storage.

Although specific terms have been used in describing the invention, they have been used in a descriptive and generic sense only and not for the purpose of limitation, the scope of the invention being defined by the following claims to invention.

I claim:

1. An alignment guide assembly for use by an operator in aligning and connecting a hitch ball on a trailer hitch at the rear of a tow vehicle with a socket on the tongue of a trailer, said alignment guide assembly comprising:
    (a) a stop bracket on the trailer hitch at the rear of the tow vehicle;
    (b) an alignment guide on the tongue of the trailer, and
    (c) the alignment guide including means adjustably fixing the alignment guide to the trailer's tongue for movement of the alignment guide between an inoperative position on top of the trailer's tongue and an operative position beneath the trailer's tongue without removing the alignment guide from the trailer's tongue.

2. The invention of claim 1 wherein the alignment guide comprises:
    (a) means for longitudinally aligning the hitch ball and socket as the rear of the tow vehicle is moved toward the tongue of the trailer;
    (b) means for engaging the stop bracket on the tow vehicle when the tow vehicle is a predetermined distance from the socket on the tongue of the trailer; and
    © means for vertically aligning the hitch ball and socket when the second means engages the stop bracket.

3. The invention of claim 2 wherein there is a locking assembly on the tongue of the trailer for use by the operator in locking the socket to the hitch ball and the alignment guide includes fourth means which positions the socket at the operable elevation relative to the hitch ball for the operator to activate the locking assembly and lock the socket to the hitch ball.

4. The invention of claim 2 wherein said means which longitudinally aligns the hitch ball and socket comprises forwardly diverging guide plates that extend beyond the socket when the alignment guide is in its operative position.

5. The invention of claim 2 wherein said means which engages the stop bracket when the tow vehicle is a predetermined distance in front of the trailer comprises a stop plate including a leading edge spaced forwardly a predetermined distance from the socket when the alignment guide is in its operative position.

6. The invention of claim 3 wherein the means which positions the socket at the operable elevation relative to the hitch ball for the operator to activate the locking assembly and lock the socket to the hitch ball comprises an abutment extending downwardly from the alignment guide and engageable with the trailer hitch on the tow vehicle when the socket is at a predetermined elevation above the hitch ball.

7. The invention of claim 1 wherein said means adjustably fixing the alignment guide to the trailer's tongue includes a U-shaped bracket fixed in transverse and downwardly extending relation to the top of the trailer's tongue.

8. The invention of claim 7 wherein the U-shaped bracket is bolted to the top of the trailer's tongue.

9. The invention of claim 7 wherein the U-shaped bracket is welded to the top of the trailer's tongue.

10. The invention of claim 7 wherein the alignment guide includes side walls pivotally connected to the downwardly extending portions of the U-shaped bracket.

11. The invention of claim 10 wherein said means adjustably fixing the alignment guide to the trailer's tongue includes a hold-down bar pivotally connected at one end to one side wall of the alignment guide, and a handle pivotally connected to the other end of the hold-down bar.

12. The invention of claim 11 which includes means releasably locking the hold-down bar beneath the trailer's tongue when the alignment guide is in the operative position beneath the trailer's tongue, and means releasably locking the handle to hold the hold-down bar above the trailer's tongue when the alignment guide is in the inoperative position above the trailer's tongue.

13. An alignment guide assembly for aligning a hitch ball on a trailer hitch at the rear of a tow vehicle with a socket on the tongue of a trailer, said alignment guide assembly comprising:
    (a) a stop bracket on the tow vehicle;
    (b) an alignment guide on the tongue of the trailer, the alignment guide being movable between an operative position and an inoperative position and including:

(i) a bracket spaced rearwardly from the socket and extending transversely across the tongue of the trailer;
(ii) means fastening the bracket to the tongue of the trailer,
(iii) a pair of side walls extending forwardly from the bracket in laterally spaced relation to opposite sides of the tongue of the trailer;
(iv) means pivotally connecting the side walls to the bracket, the side walls comprising:
  (a) body portions extending forwardly from the bracket to the socket when the alignment guide is in its operative position and
  (b) forwardly diverging guide plates extending forwardly from the body portions of the side walls when the alignment guide is in its operative position;
(v) a stop plate extending between the guide plates, the stop plate including:
  (a) a leading edge and
  (b) a curved seat at the rear of the stop plate;
(vi) a hold-down bar including a handle, the handle being pivotally connected to one end of the hold-down bar adjacent one side wall;
(vii) means pivotally connecting the opposite end of the hold-down bar to the opposite side wall;
(viii) means releasably latching said one end of the hold-down bar to said one side wall;
whereby the side walls of the alignment guide may be positioned beside the tongue of the trailer and the hold-down bar may be positioned under the tongue of the trailer and latched to the second side wall in the operative position of the alignment guide and the side walls of the alignment guide may be rotated to extend upwardly from the top of the tongue of the trailer and the hold-down bar may be rotated downwardly from its operative position beneath the tongue of the trailer and then upwardly into latched engagement with said one side wall when the alignment guide is in its inoperative position; and
  (c) means for releasably latching the handle to the tongue of the trailer when the alignment guide is in its inoperative position.

14. An alignment guide assembly for use by an operator in aligning and connecting a hitch ball on a trailer hitch at the rear of a tow vehicle with a socket on the tongue of a trailer, said alignment guide assembly comprising:
(A) a stop bracket on the trailer hitch at the rear of the tow vehicle;
(B) an alignment guide on the tongue of the trailer, the alignment guide being movable between operable and inoperable positions and including:
  (I) means for longitudinally aligning the hitch ball and socket as the rear of the tow vehicle is moved toward the tongue of the trailer, said means for longitudinally aligning the hitch ball and socket as the rear of the tow vehicle is moved toward the tongue of the trailer comprising forwardly extending guide plates that extend beyond the socket when the alignment guide is in its operative position;
  (ii) means for engaging the stop bracket on the tow vehicle when the tow vehicle is a predetermined distance from the socket on the tongue of the trailer, said means for engaging the stop bracket on the tow vehicle when the tow vehicle is a predetermined distance from the socket on the tongue of the trailer comprising a stop plate including a leading edge spaced forwardly a predetermined distance from the socket when the alignment guide is in its operative position;
  (iii) means which vertically aligns the hitch ball and socket when the stop plate engages the stop bracket, said means which vertically aligns the hitch ball and socket when the stop plate engages the stop bracket comprising:
    (a) a leg on the stop bracket that is spaced a predetermined distance forwardly of the hitch ball;
    (b) a curved seat on the alignment guide, the curved seat being vertically aligned with the socket; and
    (c) the leading edge of the stop plate being spaced forwardly from the curved seat the same distance as the leg of the stop bracket is spaced forwardly from the hitch ball.

* * * * *